United States Patent [19]

Lindblom

[11] 4,183,668

[45] Jan. 15, 1980

[54] METHOD OF ELIMINATING ASTIGMATISM AND COMA IN A SPECTROGRAPH INCLUDING A PLANE GRATING AND TWO CONCAVE, SPHERICAL MIRRORS

[75] Inventor: Peter Lindblom, Nagu, Finland

[73] Assignee: Applied Research Laboratories S.A., Ecublens, Switzerland

[21] Appl. No.: 891,337

[22] Filed: Mar. 29, 1978

[30] Foreign Application Priority Data

Apr. 4, 1977 [SE] Sweden .................... 7703880

[51] Int. Cl.² .............................. G01J 3/40
[52] U.S. Cl. ................................. 356/305
[58] Field of Search ............. 356/79, 99, 100, 305, 356/331, 332, 334

[56] References Cited

U.S. PATENT DOCUMENTS

| 3,048,080 | 8/1962 | White ........................... 356/99 |
| 3,567,323 | 3/1971 | Chupp et al. ................... 356/99 |
| 3,985,443 | 10/1976 | Danielsson ................ 356/305 X |

OTHER PUBLICATIONS

Schroeder; *Publ. Astron. Soc. Pacific (USA)*, vol. 82, No. 490, Dec. 1970, pp. 1253–1279.
Kaneko et al., *Applied Optics*, vol. 10, No. 2, Feb. 1971, pp. 367–381.
Horwitz, *Optica Acta*, vol. 21, No. 3, Mar. 1974, pp. 169–190.

*Primary Examiner*—F. L. Evans
*Attorney, Agent, or Firm*—Cantor and Singer

[57] ABSTRACT

To eliminate astigmatism and coma in a spectrograph the distance between the entrance slot and a first concave mirror, as well as the relative angular positions of the entrance slot, the plane grating, the two concave mirrors and the focal plane are selected so as to satisfy the following conditions.

$$\frac{1}{r_1} = 2(1 - \frac{\cos^2 \alpha}{\cos^2 \beta})^{-1} \left[ \frac{\sin^2 b_a}{R_2 \cos b_a} + \frac{1}{R_1 \cos a} (1 - \cos^2 a \frac{\cos^2 \alpha}{\cos^2 \beta}) \right] \text{ and}$$

$$\tan a = (\frac{R_1}{R_2})^2 \sin b_c \cos b_c \frac{\cos^2 \beta}{\cos^2 \alpha}$$

10 Claims, 4 Drawing Figures

METHOD OF ELIMINATING ASTIGMATISM AND COMA IN A SPECTROGRAPH INCLUDING A PLANE GRATING AND TWO CONCAVE, SPHERICAL MIRRORS

BACKGROUND OF THE INVENTION

Spectrographs including plane diffraction grating for dispersing light into wavelength-components have been proposed. Such spectrographs usually include two concave mirrors, of which one is used to collimate the light passing through the entrance slot of the spectrograph, and the other is used to focus the light dispersed by the plane grating as a spectrum. Spherical, concave mirrors are mostly used, as they are easily manufactured with the necessary exactness at the optical surface.

The use of concave mirrors, however, means that the impinging light will form an angle with respect to a normal of the mirror surface, which will introduce aberrations in the spectrum. The two most noticeable aberrations are called astigmatism and coma. The first-mentioned one means that a pointshaped entrance opening will show up as a line upon the focal surface, and the other one, that the point will be located assymetrically and having a cometshaped shading. In a spectrograph, where a spectrum is obtained in one dimension upon a photographic plate, astigmatism will not be particularly detrimental, as it will only mean an elongation of the image of the slot in the focal plane. Coma, on the other hand, means a reduced resolving power, as the image of the slot will have a comatic shading to one of its sides, resulting in an assymetric profile of the spectral line. M. Czerny & A. F. Turner (Z. Phys. 61, 792 (1930)) have shown that the comatic aberration can be relieved by spacing the mirrors, and locating them in such angular positions, that the aberration caused by one mirror will be counteracted by the other mirror. Such arrangement is nowadays used in most plane grating spectrographs having spherical concave mirrors.

When the plane grating is of the Echelle type (Spectrochimica Acta 6, 61, (1953)), which will produce spectra of high spectral orders, and is combined with a further wavelength-dispersing, optical member, mounted in such a manner that its wavelength dispersion is perpendicular to that of the Echelle grating, the resulting spectrum will be divided into segments arranged below each other in the focal plane. In such Echelle-spectrographs it is important, that the image is free of astigmatism, as otherwise the spectral segments would overlap each other.

That may be further accentuated in an instrument, where the focal surface is the photo cathode of an image tube, as the size of the photo cathode is limited. Images compensated with respect to astigmatism and coma have been obtained by means of expensive un-spherical mirrors, which are difficult to manufacture, or by a noticeable reduction of the height of the grating, which results in a reduced luminous power.

By means of the present invention it is possible to obtain a stigmatically and comatically compensated spectrum in a plane grating arrangement including spherical mirrors without any reduction of the height of the grating being necessary.

SUMMARY OF THE INVENTION

In order to avoid astigmatism and coma in a spectrograph having an entrance slot, a plane diffraction grating, two concave spherical mirrors and a focal plane, the radii ($R_1$, $R_2$) of the two concave mirrors, the distance ($r_1$) between the entrance slot and a center point upon the surface of the first mirror, as well as the relative angular positions of the entrance slot, the plane grating, the two mirrors and the focal plane are selected so as to satisfy the following conditions.

$$\frac{1}{r_1} = 2(1 - \frac{\cos^2 \alpha}{\cos^2 \beta})^{-1} \left[ \frac{\sin^2 b_a}{R_2 \cos b_a} + \frac{1}{R_1 \cos a}(1 - \cos^2 a \frac{\cos^2 \alpha}{\cos^2 \beta}) \right] \text{ and}$$

$$\tan a = (\frac{R_1}{R_2})^2 \sin b_c \cos b_c \frac{\cos^2 \beta}{\cos^2 \alpha},$$

wherein further $\alpha$, $\beta$, a, $b_a$ and $b_c$ refer to angles formed between various beams and normals to the associated surfaces.

For a more exact positioning of the mirrors the distances ($D_1$ and $D_2$) between the first mirror and the plane grating, as well as between the latter and the second mirror should also be considered, as stated in expression $$\left[ D_2 + D_1 \frac{\cos^2 \beta}{\cos^2 \alpha} + \frac{\cos^2 \beta}{\cos^2 \alpha}(\frac{2\cos a}{R_1} - \frac{1}{r_1})^{-1} \right]^{-1} =$$

$$\frac{2\sin 2b_a}{R_2 \cos b_a} + \left[ D_1 + D_2 + (\frac{2}{R_1 \cos a} - \frac{1}{r_1})^{-1} \right]^{-1}$$

Preferably angles $b_a$ and $b_c$ are selected so as to be of the same magnitude, angle $b_a$ should preferably be selected so it corresponds with the portion of the focal surface, where the spacing between the spectral segments is a minimum.

The plane grating preferably is a so called Echelle grating, and the spectrograph preferably includes at least one further optical member, mounted in the path of a beam of light passing from the first mirror to the other mirror. This optical member preferably is a so called Littrow prism.

The focal surface preferably is the photo-cathode of an image tube connected to computer means for analyzing the spectrum projected upon the photo-cathode.

DESCRIPTION OF A PREFERRED EMBODIMENT

In a spectrograph according to the invention the planes of reflection of the collimating mirror, as well as that of the focusing mirror are perpendicular with respect to the diffraction plane of the grating.

Figure 1:
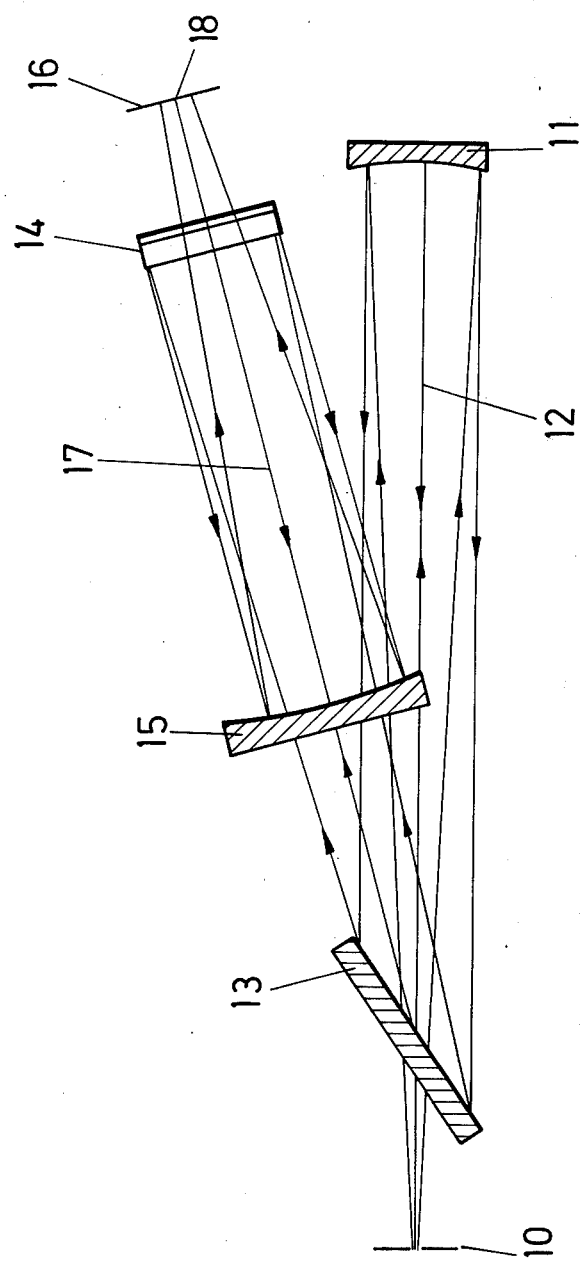
FIG. 1 schematically shows the components of a spectrograph according to the invention.

FIG. 1 schematically shows a projection of the arrangement of the components of the spectrograph in the diffraction plane of the plane grating.

In FIG. 1 10 denotes the entrance slot of the spectrograph. The light passing through this slot will meet a spherical collimating mirror 11, and is in FIG. 1 schematically indicated by arrows. A normal with respect to a tangent to the surface of collimating mirror at a point, where a central beam of light 12 impinges upon this surface, will be located in a plane being perpendicular to the plane of the paper upon which FIG. 1 is shown, and containing this central beam 12. In this plane of reflection said normal is directed downwardly from the plane of the paper, the light issuing from the entrance slot 10 passing below grating 13. The collimating mirror 11 will reflect the light towards the plane grating 13, from which the dispersed radiation will be mainly directed towards a so called Littrow prism 14, of well known type. This prism will disperse the light in a plane perpendicular with respect to that of the paper showing FIG. 1, and will meet the spherical concave mirror 15, which focuses the light as a spectrum upon the focal surface 16. A normal to a tangent plane to the surface of the mirror, at a point where a central beam 17 impinges upon this surface, will be located in a plane containing said central beam 17, and being perpendicular to the plane of the paper containing FIG. 1. Said normal is, in this plane of reflection, directed upwardly from the central beam 17, issuing from prism 14, the light reflected by mirror 15 passing through prism 14. The point where the central beam 17 impinges upon the focal surface 16 is in FIG. 1 denoted by 18.

Figure 2:
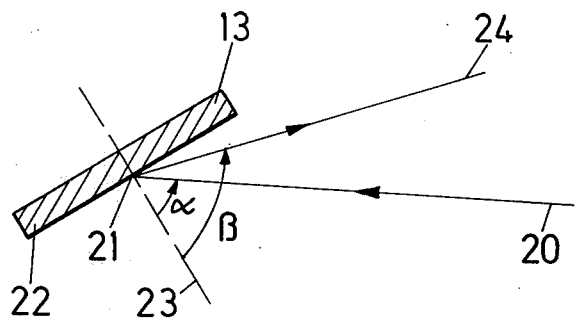
FIG. 2 shows the diffraction plane of an Echelle grating.

FIG. 2 shows the plane grating 13. A central beam reflected towards grating surface 22 by collimating mirror 11 of FIG. 1, is here denoted by 20, and impinges upon grating surface 22 of grating 13 at its center 21.

A normal to grating surface 22 is in FIG. 2 denoted by 23. After diffraction at grating surface 22 a central beam 24 will be directed towards prism 14 in FIG. 1. The angle between normal 23 and the in-coming, central beam 20 is denoted by $\alpha$, while the angle between normal 23 and the issuing beam 24 is denoted by $\beta$. A plane passing through the center 21 of the diffraction surface, and containing beams 20 and 24 is called the diffraction plane of the grating.

Figure 3:
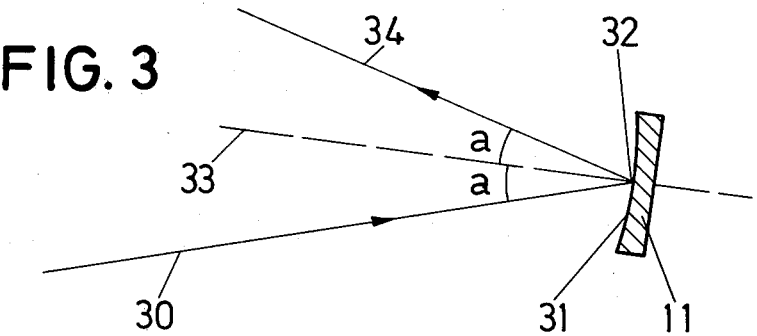
FIG. 3 shows the reflection plane of the collimating mirror.

FIG. 3 schematically shows collimating mirror 11 of FIG. 1 in its plane of reflection.

Reference 30 denotes an in-coming central beam, having passed through entrance slot 10 of FIG. 1, and impinging centrally upon the spherical reflecting surface 31 at point 32. A normal to a tangent plane to said surface 31 at point 32 is in FIG. 3 denoted by 33. Upon reflection at point 32 a beam 34 will issue in the direction of the plane grating 13 of FIG. 1. The angle between beam 30 and normal 33 is denoted by a, the angle between beam 34 and normal 33 having the same magnitude.

Figure 4:
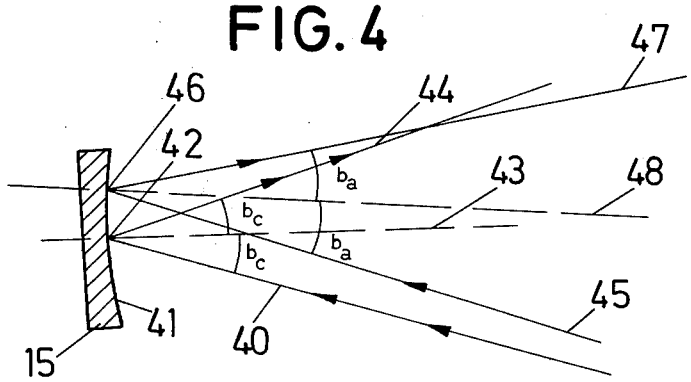
FIG. 4 shows the reflection plane of the focusing mirror.

FIG. 4 schematically shows focusing mirror 15 of FIG. 1 in its plane of reflection. Reference 40 denotes a central beam dispersed by prism 14 of FIG. 1, which impinges centrally upon the spherical, reflecting surface 41 of mirror 15, at point 52. A normal with respect to a tangent plane to surface 41 at point 42 is in FIG. 4 denoted by 43. After reflection at point 42 a beam 44 issues in the direction towards the focal surface 16 of FIG. 1. The angle between beam 40 and normal 43 is denoted by $b_c$, the angle between beam 44 and said normal 43 having the same magnitude.

In the same manner a further beam 45 issuing from prism 14 is shown in FIG. 4, which is reflected at point 46 upon the mirror surface 41, and is directed towards focal surface 16. The reflected beam is in FIG. 4 denoted by 47. A normal in relation to a tangent plane to surface 41 at point 46 is denoted by 48. The angle between beam 45 and said normal is denoted by $b_a$, the angle between beam 47 and said normal 48 having the same magnitude.

It is known fact, that if slot 10 is located at a distance $r_1$ from the center point 42 of the collimating mirror surface, being defined by the expression $$r_1 = R_1/2 \cos a \qquad (1)$$

where $R_1$ denotes the radius of the mirror surface 31 and a is defined as above described in relation to FIG. 3, the plane grating 13 will be impinged upon by beams which all are parallel in the diffraction plane of the grating. On such occasion, further, all beams including the same wavelengths, which are dispersed by the grating will be parallel in said plane.

It is further known, that a spectrum is obtainable at the focal plane, if the distance $r_2$ between the center 42 of mirror surface 41 and point 18 at the focal plane 26 is selected so as to be defined by the expression $$r_2 = R_2/2 \cos b_c \qquad (2)$$

where $R_2$ is the radius of the mirror surface 41 of the focusing mirror, and $b_c$ an angle as defined for the central beam in connection with FIG. 4.

When the loactions of slot 10 and of the focal surface 16 are selected as described above, it is said, that slot 10 and focal surface 16 are located in the vertical focus of the associated mirrors 11 and 15, respectively. It is also known, that the image of slot 10 upon focal surface 16 will suffer from the aberration called astigmatism, as described above.

If slot 10 is removed somewhat more from collimating mirror 11, than is defined by expression (1) the beams impinging upon grating surface 22 will converge somewhat in the plane of diffraction. If, on the other hand, slot 10 is moved closer to collimating mirror 11, than defined in expression (1), the beams impinging upon grating surface 22 will diverge somewhat in the plane of diffraction.

On both occasions the plane grating will influence the focusing conditions concerning the reproduction of slot 10 upon focal surface 16, when the angle of ingress $\alpha$, and the diffraction angle $\beta$ in FIG. 2 are of the same magnitude. By selecting the position of slot 10 suitably in relation to pre-selected values of angles $\alpha$ and $\beta$, it is according to the invention possible to reproduce images of slot 10 upon focal plane 16, which do not suffer from astigmatism. The condition for obtaining such result is defined by the expression $$\left[ D_2 + D_1 \frac{\cos^2 \beta}{\cos^2 \alpha} + \frac{\cos^2 \beta}{\cos^2 \alpha} \left( \frac{2\cos a}{R_1} - \frac{1}{r_1} \right)^{-1} \right]^{-1} = \frac{2\sin 2b_a}{R_2 \cos b_a} + \left[ D_1 + D_2 + \left( \frac{2}{R_1 \cos a} - \frac{1}{r_1} \right)^{-1} \right]^{-1} \qquad (3)$$

where $\alpha$, $\beta$, a, $b_a$, r, $R_1$ and $R_2$ have the interpretation as above defined. In the expression $D_1$ further defines the distance between the center point 32 upon the surface of the collimating mirror, and center point 21 upon grating surface 22. $D_2$ defines the distance a beam will have to cover from said point 21, before it impinges upon mirror surface 41 at point 46. With pre-selected values of $\alpha$, $\beta$, a, $b_a$, $R_1$ and $R_2$, expression (3) will provide the magnitude of r, which defines the location of entrance slot 10 in relation to mirror 11. With the wavelengths of the light defined by the magnitudes of the selected units a reproduction upon the focal plane 16 is obtained, which does not suffer from astigmatism.

Very often angles a and $b_a$ will be small. On most occasions the quantities $$\left(\frac{2}{R_1 \cos a} - \frac{1}{r_1}\right)^{-1}$$

and $$\left(\frac{2 \cos a}{R_1} - \frac{1}{r_1}\right)^{-1}$$

in the expression (3) will amount to values being considerably bigger than factors $D_1$ and $D_2$. Those may then be neglected in expression (3), which may be rewritten in the following manner $$\frac{1}{r_1} = 2\left(1 - \frac{\cos^2 \alpha}{\cos^2 \beta}\right)^{-1} \left[\frac{\sin^2 b_a}{R_2 \cos b_a} + \frac{1}{R_1 \cos a}\left(1 - \cos^2 a \frac{\cos^2 \alpha}{\cos^2 \beta}\right)\right] \quad (4)$$

In order to illustrate the use of this expression the following numerical values may be considered $R_1 = 1380$ mm, $R_2 = 994.2$ mm, $D_1 = 578$ mm, $D_2 = 976.6$ mm, $a = 3.516°$, $b_a = 3.2°$. Expression (3) will then allot a value to $r_1$ of 696.85 mm, while expression (4) will result in 696.74 mm. If the position of slot 10 is determined by expression (1) the value of $r_1$ will be 691.30 mm. In the example selected, astigmatism will be avoided by moving slot 10 5.55 mm further away from mirror 11 than defined by expression (1). Grating 13 will then be impinged upon by beams, which converge somewhat in the plane of diffraction. It is further obvious, that the result according to expression (3) differs from that according to expression (4) only by 0.1 mm. It is also possible to show that image aberration coma will be practically eliminated according to the invention, if the quantities are further selected so the conditions defined in the expression below, are met $$\tan a = \left(\frac{R_1}{R_2}\right)^2 \sin b_c \cos b_c \frac{\cos^2 \beta}{\cos^2 \alpha} \quad (5)$$

Expression (5) intentionally includes angle $b_c$ of FIG. 4, in order to make possible an elimination of astigmatism as well as of coma, with different angles of reflection at focusing mirror 15. It should, however, be remembered, that expression (5) holds for small values of the angles, about 5°, or less for quantity $b_c$. Astigmatism and coma will, however, be eliminated with the same angle of reflection at the focusing mirror, when $b_c = b_a$ in expressions (3), (4) and (5). In a spectrograph mounting according to the invention expressions (3) and (4) or (5) ought to be satisfied simultaneously in order to eliminate astigmatism and coma at selected portions of the focal surface. If the value of $b_c$ is selected $b_c = 3.74°$, and further the values above defined are used, expression (5) will result in $a = 3.52°$. The selected example will thus result in an image lacking coma aberration within the portion of focal surface 16 corresponding to an angle of reflection $b_c = 3.74°$.

In a mounting according to FIG. 1 prism 14 will in a wellknown manner provide a subdivision of the spectrum into segments upon focal surface 16 in such a manner that each segment will represent a spectral order of grating 13. The distance between the spectral segments upon focal surface 16 may vary, and it is an advantage to be able to eliminate astigmatism at an angle of reflection $b_a$, corresponding to a portion of the focal surface, where the distance between the segments is a minimum.

The invention is not limited to the embodiments above described, but may be defined in many other ways, within the scope of the appended claims. The invention may thus be used also with spectrographs lacking prism 14. The focal surface 16 may be a photographic plate, or a film, or the photo-cathode of a picture tube (not shown) by means of which the spectral image is evaluated.

What I claim is:

1. A method of eliminating image aberrations, such as astigmatism and coma, in a spectrograph system, which includes an entrance slot, a plane diffraction grating, first and second concave, spherical mirrors and a focal plane characterized in selecting the reflection angles of said two mirrors, and the position of the entrance slot in relation to said first, concave mirror in such a manner, that the following mathematical conditions are simultaneously satisfied for at least one wave-length within the radiation expected to be received by the spectrograph system, $$\frac{1}{r_1} = 2\left(1 - \frac{\cos^2 \alpha}{\cos^2 \beta}\right)^{-1} \left[\frac{\sin^2 b_a}{R_2 \cos b_a} + \frac{1}{R_1 \cos a}\left(1 - \cos^2 a \frac{\cos^2 \alpha}{\cos^2 \beta}\right)\right] \text{ and}$$

$$\tan a = \left(\frac{R_1}{R_2}\right)^2 \sin b_c \cos b_c \frac{\cos^2 \beta}{\cos^2 \alpha},$$

in which the symbols have the following denominations:

$r_1$ denotes the distance between said entrance slot and a point at the reflecting surface of a first of the mirrors, a denotes the angles between a central beam issuing from said entrance slot and impinging upon said first mirror at the point above referred to, and a normal to a tangent plane to said surface at said point, $R_1$ denotes the radius of curvature for the reflecting surface of said first mirror, $\alpha$ denotes the angle between a first beam impinging upon said plane grating and normal thereto at the point upon the grating surface where the beam impinges, β denotes the angle between a second beam and said normal, after diffraction at said point upon said grating surface, $R_2$ denotes the radius of curvature of the spherical surface of said second mirror, $b_a$ denotes the angle between a beam impinging upon said second mirror and a normal to a tangent plane to said second mirror surface, through the impinging point, and finally $b_c$ denotes the angle between an arbitrarily selected beam, which impinges upon the surface of said second mirror, and a normal to a tangent plane to said second mirror surface, at the impining point.

2. The method according to claim 1 characterized in further determining the relative positions of said plane grating and said two concave mirrors according to the expression $$\left[ D_2 + D_1 \frac{\cos^2 \beta}{\cos^2 \alpha} + \frac{\cos^2 \beta}{\cos^2 \alpha} \left( \frac{2\cos a}{R_1} - \frac{1}{r_1} \right)^{-1} \right]^{-1} =$$

$$\frac{2\sin 2b_a}{R_2 \cos b_a} + \left[ D_1 + D_2 + \left( \frac{2}{R_1 \cos a} - \frac{1}{r_1} \right)^{-1} \right]^{-1},$$

in which $D_1$ denotes the distance covered by a beam from a point upon the surface of said first mirror surface to a point upon the surface of said plane diffraction grating, where the beam impinges, $D_2$ denotes the distance covered by a second beam from the point at said grating surface to a point upon the reflecting surface of said second concave mirror, and the other symbols are interpreted as defined in claim 1.

3. The method according to claim 1, characterized in selecting angles $b_c$ and $b_a$ to be of the same magnitude.

4. The method according to claim 1, characterized in selecting for said plane grating an Echelle grating, and mounting at least one further optical member, adapted to cause wave-length dispersion in the path of a beam of light passing from said first concave mirror to said second concave mirror, whereby the spectrum upon focal surface will be subdivided into segments, each being a spectral order of said Echelle grating.

5. The method according to claim 1 characterized in using the photo-cathode of an image tube, by means of which the spectrum can be analyzed, as the focal surface.

6. The method according to claim 4, characterized in selecting angle $b_a$ in such a manner, that it will correspond to the portion of the focal surface, where the spacing between the spectral segments is a minimum.

7. A spectrograph arranged to eliminate astigmatism and coma and comprising an entrance slot, first and second concave, spherical mirrors and a focal plane, said entrance slot being located at a distance $r_1$ from said first mirror, said first mirror having a radius of curvature of its reflecting surface = $R_1$, said second mirror having a radius of curvature of its reflecting surface = $R_2$, and a plane diffraction grating, the angular positions between said plane grating and said first and second mirrors being determined by $$\frac{1}{r_1} = 2\left(1 - \frac{\cos^2 \alpha}{\cos^2 \beta}\right)^{-1} \left[ \frac{\sin^2 b_a}{R_2 \cos b_a} + \right.$$

$$\left. \frac{1}{R_1 \cos a} \left(1 - \cos^2 a \frac{\cos^2 \alpha}{\cos^2 \beta}\right) \right] \text{ and }$$

$$\tan a = \left(\frac{R_1}{R_2}\right)^2 \sin b_c \cos b_c \frac{\cos^2 \beta}{\cos^2 \alpha},$$

in which the symbols have the following denominations:

a denotes the angle between a central beam issuing from the entrance slot and impinging upon said first mirror at the point above referred to, and a normal to a tangent plane to said surface at said point, α denotes the angle between a first beam impinging upon said plane grating and a normal thereto at the point upon the grating surface where the beam impinges, β denotes the angle between a second beam and said normal (23), after diffraction at said point upon said grating surface, $b_a$ denotes the angle between a beam impinging upon said second mirror and a normal to a tangent plane to said second mirror surface, through the impinging point, and finally $b_c$ denotes the angle between an arbitrarily selected beam, which impinges upon the surface of said second mirror, and a normal to a tangent plane to said mirror surface, at the impinging point.

8. The spectrograph according to claim 7, where the relative positions of said plane grating and of said first and second concave mirrors is further defined by the distance $D_1$ covered by a beam from a point upon said first mirror to a point upon the surface of said plane diffraction grating, where the beam impinges, and the distance $D_2$ covered by a second beam from the point at the grating surface to a point upon the reflecting surface of said second concave mirror satisfy the expression $$\left[ D_2 + D_1 \frac{\cos^2 \beta}{\cos^2 \alpha} + \frac{\cos^2 \beta}{\cos^2 \alpha} \left( \frac{2\cos a}{R_1} - \frac{1}{r_1} \right)^{-1} \right]^{-1} =$$

$$\frac{2\sin 2b_a}{R_2 \cos b_a} + \left[ D_1 + D_2 + \left( \frac{2}{R_1 \cos a} - \frac{1}{r_1} \right)^{-1} \right]^{-1}.$$

9. The spectrograph according to claim 7, in which the plane grating is an Echelle grating, and a further optical member is mounted in the path of a beam of light passing from the first concave mirror to said second concave mirror.

10. The spectrograph according to claim 9, in which the further optical member is a Littrow prism, and is mounted between said plane grating and said second concave mirror.

* * * * *